(12) United States Patent
Matheny

(10) Patent No.: US 8,070,453 B1
(45) Date of Patent: Dec. 6, 2011

(54) CENTRIFUGAL IMPELLER HAVING FORWARD AND REVERSE FLOW PATHS

(75) Inventor: Alfred P Matheny, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 18 days.

(21) Appl. No.: 12/636,756

(22) Filed: Dec. 13, 2009

Related U.S. Application Data

(63) Continuation of application No. 11/133,094, filed on May 19, 2005, now abandoned.

(51) Int. Cl.
*B64C 11/16* (2006.01)
*F02C 3/04* (2006.01)
(52) U.S. Cl. .................................. 416/231 R; 60/39.43
(58) Field of Classification Search ............... 60/39.43, 60/39.45, 772; 415/106; 416/181, 231 R
See application file for complete search history.

(56) References Cited

U.S. PATENT DOCUMENTS

| | | | | |
|---|---|---|---|---|
| 2,694,291 A | * | 11/1954 | Rosengart | 60/804 |
| 3,749,520 A | * | 7/1973 | Bandukwalla | 416/183 |
| 6,966,174 B2 | * | 11/2005 | Paul | 60/226.1 |
| 2003/0192303 A1 | * | 10/2003 | Paul | 60/262 |
| 2003/0192304 A1 | * | 10/2003 | Paul | 60/262 |
| 2004/0025490 A1 | * | 2/2004 | Paul | 60/39.43 |

* cited by examiner

*Primary Examiner* — William Rodriguez
*Assistant Examiner* — Gerald Sung
(74) *Attorney, Agent, or Firm* — John Ryznic

(57) ABSTRACT

A centrifugal impeller having an inlet and a plurality of outlets, the outlets including at least one outlet in a forward direction of the impeller and at least one outlet in a rearward direction of the impeller. A flow path distance of the outlet in the forward direction can be greater than a flow path distance of the outlet in the rearward direction in order to provide a greater pressure in the outlet having the greater flow path distance. In another embodiment, the flow path volume in the forward direction can be greater than the flow path volume in the rearward direction in order to provide a greater flow volume in the forward direction. In another embodiment, the number of flow paths in the forward direction can be greater than the number of flow paths in the rearward direction in order to provide a greater flow volume in the forward direction. The impeller is also used in a gas turbine engine in which the impeller also includes a turbine blade, and the forward directing outlets deliver compressed air to a combustor while the rearward directed outlets bypass the combustor.

14 Claims, 1 Drawing Sheet

CENTRIFUGAL IMPELLER HAVING FORWARD AND REVERSE FLOW PATHS

CROSS-REFERENCE TO RELATED APPLICATIONS

This application is a CONTINUATION of U.S. patent application Ser. No. 11/113,094 filed on May 19, 2005 and entitled CENTRIFUGAL IMPELLER WITH FORWARD AND REVERSE FLOW PATHS.

GOVERNMENT LICENSE RIGHTS

None.

BACKGROUND OF THE INVENTION

1. Field of the Invention

The present invention relates to a centrifugal impeller having both a forward flow path and a rearward flow path for driving a fluid such as a gas or a liquid in two different directions, and more specifically to an impeller used in a small gas turbine engine in the compressor section.

2. Description of the Related Art Including Information Disclosed Under 37 CFR 1.97 and 1.98

Centrifugal impellers are well known in the art of pumps used to pump a fluid such as a liquid or a gas. In a centrifugal impeller, a plurality of closed fluid paths is formed between an inner surface and an outer surface of the impeller. A common inlet located upstream of the plurality of closed fluid paths allows for the fluid to enter the impeller and then be divided up into the plurality of flow paths. Each flow path includes an exit to discharge the fluid from the impeller. Rotation of the impeller acts to drive the fluid from the inlet, through the closed passages, and out the individual outlets. In all prior art impellers, the inventors of the present invention are not aware of any that disclose outlets in more than one direction.

Gas turbine engines are known to have a compressor to compress air to be delivered to a combustor, and a fan to provide a bypass to the combustor. In this arrangement, a fan for the bypass is a separate impeller than the compressor used to deliver pressurized air to the combustor.

It is a purpose of the present invention to provide for a centrifugal impeller that includes both a forward directed flow path and a rearward directed flow path.

It is another object of the present invention to provide for a gas turbine engine that has both a combustion flow path and a bypass flow path, in which the centrifugal impeller of the present invention provides for both the flow path into the combustion chamber and the flow path for the bypass of the fan.

BRIEF SUMMARY OF THE INVENTION

The present invention is a centrifugal impeller with an alternating series of outlets, where one set of outlets directs air from the impeller in a forward direction, while the other set of outlets directs air toward in a rearward direction. A radial distance from the centerline of the impeller to the outlet of one path differs from the radial distance of another oath in order to vary the pressure of the flow paths. The forward flow path, because the radial distance is greater, will have a higher outlet pressure, and thus a greater flow volume, than would the flow path having the shorter radial distance.

A second embodiment of the present invention would include an unequal number of flow paths in the forward direction than in the rearward. In this embodiment, an even greater difference in flow volume can be produced because of the greater number of flow paths leading in the preferred direction.

In a third embodiment of the present invention, a number forward flow paths can be equal to a number of rearward flow paths, but the size of one of the flow paths can be larger to provide a greater flow volume in the direction having the greater number of flow paths.

The two path impeller of this invention is intended to be used in a gas turbine engine in which a forward flow from the impeller is supplied to the combustor and the rearward flow bypasses the combustor in the direction of the outlet of the turbine.

DETAILED DESCRIPTION OF THE INVENTION

Figure 1:
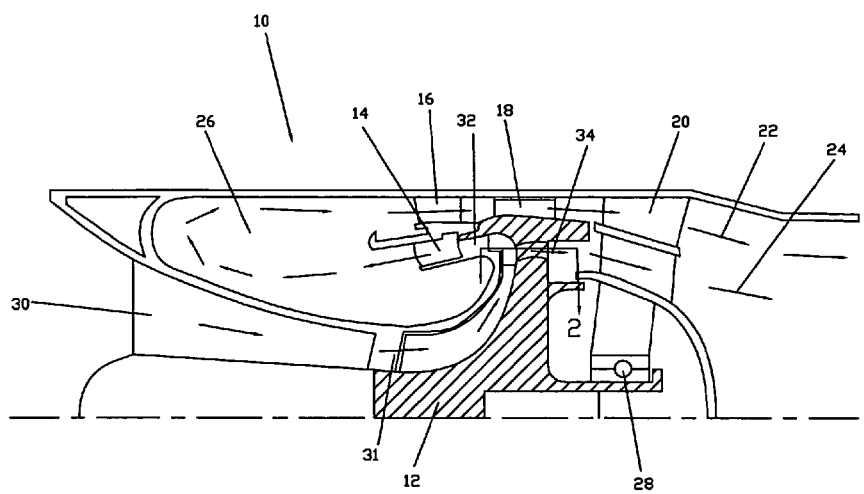
FIG. 1 shows a cross-sectional view of a small gas turbine engine with the centrifugal impeller mounted rearward of a combustor, with the front flow and the rear flow paths indicated by arrows.

A gas turbine engine 10 includes an impeller 12 to compress air for delivery to a combustor 26, guide vanes 14 and 16, a turbine blade 18 on the impeller 12 to convert hot gas airflow from the combustor 26 into useful work, an exhaust guide vane 20 downstream from the turbine blades 18, a bearing 28 to support the rotary elements of the engine, and an inlet 30 to the impeller 12.

A centrifugal impeller 12 has an inlet and an outlet for fluid that is pumped by the impeller. Impellers can pump both a liquid and a gas using the same configuration of impeller design. The impeller includes a centrally located inlet 31, a plurality of flow paths within the body of the impeller and extending from the inlet 31 through the impeller body, and a plurality of outlets 32 and 34 equal in number to the number of flow paths through the body. In the first embodiment of the present invention shown in FIG. 2, the outlets alternate between a front discharge direction 32 and a rear discharge direction 34. The front discharge outlets 32 have a guide wall section that directs the outlet flow toward the front of the impeller, while the rear discharge outlets 34 have similar shaped guide walls to direct the flow in the rearward direction. In the first embodiment shown in FIG. 2, the front discharge outlets 32 and the rear discharge outlets 34 have the same size and shape, and since the internal passages for both are the same volume capacity, the flow through the front discharge outlets is the same as the flow through the rear discharge outlets.

Figures 2, 3:
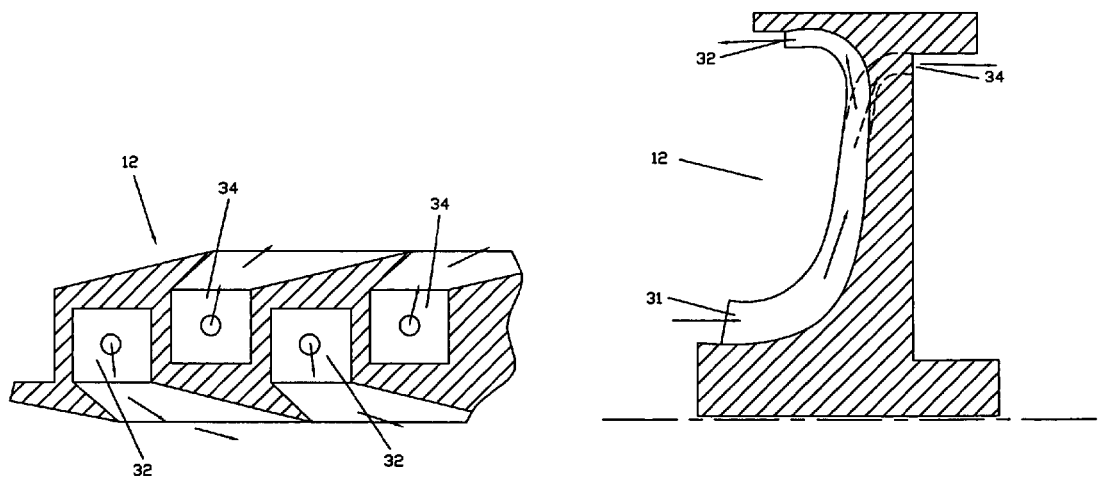
FIG. 2 shows a portion of the outer surface of the impeller with two front flow exits and two rear flow exits, the flows being indicated by arrows.
FIG. 3 shows a cross-sectional view of the impeller with a forward directed flow path and a rearward directed flow path.

The present invention is best shown in FIG. 3 in which the impeller 12 includes a plurality of forward directed flow path 32 and a plurality of rearward directed flow paths 34. In the present embodiment, the number of forward flow paths 32 is equal to the number of rearward flow paths 34. Each flow path includes an inlet 31 and a separate flow path extending from the inlet 31 to the respective outlet 32 or 34. a radial distance from the centerline to the outlet of the forward flow path is greater than a radial distance from the centerline to the outlet of the rearward flow path. Because of the difference in radial distances, the pressure in the forward flow path will be higher than the pressure in the rearward flow path. Thus, various forward to rearward pressure differences can be achieved by varying the radial distances. Decrease the rearward flow path radial distance will increase the pressure ratio of the forward flow path versus the rear flow path. If the radial distances are equal, then the pressure ratio will be one (pressure of the forward flow path will be equal to the pressure of the rearward flow path).

Further embodiments of the present invention will have a different flow volume directed toward the front versus the flow directed toward the rear. This different flow volume rate is controlled by providing more outlets directed to the higher flow rate side than the number of outlets on the lower flow rate side. Another structure to provide different flow rates would be to design the higher flow rate side with larger volume flow passages while maintaining the ratio of outlet passages at the one-to-one ratio.

I claim the following:

1. A gas turbine engine, comprising:
   a centrifugal impeller having an inlet and a plurality of outlets;
   a combustor arranged adjacent to the impeller;
   an outlet for the gas turbine engine;
   a turbine blade rotatably secured to the impeller;
   the impeller having at least one of the plurality of outlets directed toward the combustor, and the impeller having at least one of the plurality of outlets directed toward a bypass of the combustor, whereby the outlet directed toward the combustor provides compressed air for combustion and the outlet directed toward the bypass provides a bypass flow for the gas turbine engine; and,
   the outlets directed toward the combustor form separate passages extending from the inlet to the outlets within the impeller than the outlets directed toward the bypass.

2. The gas turbine engine of claim 1, and further comprising:
   a number of outlets in the impeller directed toward the combustor are equal to the number of outlets directed toward the bypass.

3. The gas turbine engine of claim 1, and further comprising:
   the outlet directed toward the combustor has a flow path distance in the impeller greater than a flow path distance in the impeller of the outlet directed to the bypass.

4. The gas turbine engine of claim 1, and further comprising:
   a number of outlets in the impeller directed toward the combustor are greater than the number of outlets directed to the bypass.

5. The gas turbine engine of claim 1, and further comprising:
   a size of the fluid passage of the outlet directed toward the combustor is greater than a size of the fluid passage of the outlet directed toward the bypass.

6. A gas turbine engine comprising:
   a centrifugal impeller having an inlet to supply air through the impeller;
   the centrifugal impeller having a plurality of forward flowing outlets and a plurality of aft flowing outlets, the forward flowing outlets and the aft flowing outlets being connected to the inlet; and,
   the forward flowing outlets are formed as separate passages extending from the inlet to the outlets within the impeller than the aft flowing outlets.

7. The gas turbine engine of claim 6, and further comprising:
   the aft flowing outlets are interspaced between the forward flowing outlets.

8. The gas turbine engine of claim 6, and further comprising:
   the forward flowing outlets have a flow path distance within the impeller greater than the flow path distance for the aft flowing outlets.

9. The gas turbine engine of claim 6, and further comprising:
   a number of forward flowing outlets is equal to a number of aft flowing outlets.

10. The gas turbine engine of claim 6, and further comprising:
    the number of forward flowing outlets in the impeller is greater than the number of aft flowing outlets.

11. The gas turbine engine of claim 6, and further comprising:
    the size of the fluid passage in the forward flowing outlets is greater than the size of the fluid passage in the aft flowing outlets.

12. The gas turbine engine of claim 6, and further comprising:
    the forward flowing outlets have a discharge direction from the impeller substantially in a direction opposite to the inlet flow to the impeller; and,
    the aft flowing outlets have a discharge direction from the impeller substantially in a direction of the inlet flow to the impeller.

13. The gas turbine engine of claim 6, and further comprising:
    the aft flowing outlets and the forward flowing outlets have a discharge direction from the impeller in a direction away from the rotational direction of the impeller.

14. The gas turbine engine of claim 6, and further comprising:
    the impeller includes a plurality of turbine blades extending outward from the impeller outlets.

* * * * *